(12) United States Patent
Selmic et al.

(10) Patent No.: US 6,611,823 B1
(45) Date of Patent: Aug. 26, 2003

(54) BACKLASH COMPENSATION USING NEURAL NETWORK

(75) Inventors: Rastko R. Selmic, Dallas, TX (US); Frank L. Lewis, Arlington, TX (US); Anthony J. Calise, Atlanta, GA (US); Michael B. McFarland, Tucson, AZ (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 09/553,601

(22) Filed: Apr. 20, 2000

(51) Int. Cl.$^7$ .......................... G06F 15/18; G05B 13/02

(52) U.S. Cl. ..................... 706/14; 706/15; 706/17; 706/23; 700/44; 700/48

(58) Field of Search ................ 706/14, 15, 31, 706/17, 23; 700/48, 44, 28; 318/561, 560

(56) References Cited

U.S. PATENT DOCUMENTS

| | | | | |
|---|---|---|---|---|
| 5,495,158 A | * | 2/1996 | Schmidt et al. | 318/561 |
| 5,710,498 A | * | 1/1998 | Yutkowitz et al. | 318/632 |
| 5,943,660 A | | 8/1999 | Yesildirek et al. | 706/10 |
| 5,946,449 A | * | 8/1999 | Dickerson et al. | 700/260 |
| 6,060,854 A | * | 5/2000 | Yutkowitz | 318/632 |
| 6,064,997 A | | 5/2000 | Jagannathan et al. | 706/23 |
| 6,185,469 B1 | | 2/2001 | Lewis et al. | 700/99 |
| 6,198,246 B1 | * | 3/2001 | Yutkowitz | 318/561 |
| 6,259,221 B1 | * | 7/2001 | Yutkowitz | 318/561 |
| 6,281,650 B1 | * | 8/2001 | Yutkowitz | 318/561 |

OTHER PUBLICATIONS

Seidl et al., Neural Network Compensation of Gear Backlash Hysteresis in Position–Controlled Mechanisms, Conference Reco of the 1993 IEEE Industry Applications Society Annual Meeting, Oct. 1993, vol. 3, pp. 2027–2034.*

Shibata et al., Nonlinear Backlash Compensation Using Recurrent Neural Network–Unsupervised Learning by Genetic Algorithm, Proceedings of the 1993 International Joint Conference on Neural Networks, Oct. 1993, vol. 1, pp. 742–745.*

Jin et al., Control of Nonlinear Mechantronics Systems by Using Universal Learning Networks, 1999 IEEE International Conference on Systems, Man and Cybernetics, Oct. 1999, vol. 5, pp. 1–6.*

Jin, Y., Decentralized Adaptive Fuzzy Control of Robot Manipulators, IEEE Transactions on Systems, Man and Cybernetics–Pa B: Cybernetics, Feb. 1998, vol. 28, No. 1, pp. 47–57.*

Selmic et al., Neural Net Backlash Compensation With Hebbian Tuning Using Dynamic Inversion, Automatica, Special Issue o Neural Networks for Feedback Control, Nov. 1999.*

(List continued on next page.)

*Primary Examiner*—John Follansbee
*Assistant Examiner*—Kelvin Booker
(74) *Attorney, Agent, or Firm*—Fulbright & Jaworski (57) ABSTRACT

Methods and systems for backlash compensation. Restrictive assumptions on the backlash nonlinearity (e.g. the same slopes of the lines, etc.) are not required. The compensator scheme has dynamic inversion structure, with a neural network in the feedforward path that approximates the backlash inversion error plus filter dynamics needed for backstepping design. The neural network controller does not require preliminary off-line training. Neural network tuning is based on a modified Hebbian tuning law, which requires less computation than backpropagation. The backstepping controller uses a practical filtered derivative, unlike the usual differentiation required by earlier backstepping routines. Rigorous stability proofs are given using Lyapunov theory. Simulation results show that the proposed compensation scheme is an efficient way of improving the tracking performance of a vast array of nonlinear systems with backlash.

20 Claims, 6 Drawing Sheets

OTHER PUBLICATIONS

Haffner et al., A Multilayer Perceptron Replaces a Feedback Linearization Controller in a Nonlinear Servomechanism, 1998 IEEE International Joint Conference on Neural Networks, May 1998.*

Cruz–Hernandez et al., Reduction of Major and Minor Hysteresis Loops in a Piezoelectric Actuator, NEC Research Index, 1998 Retrieved from the Internet: http://citeseer.nj.nec.com/90939.html.*

Bernotas et al., "Adpative control of electrically stimulated muscle," *IEEE Trans. on Biomedical Engineering*, 34: 140–147, 1987.

Byrnes and Lin, "Losslessness feedback equivalence, and the global stabilization of discrete–time nonlinear systems," *IEEE Transactions of Automatic Control*, 39(1): 83–98, 1994.

Campos and Lewis, "Deadzone compensation in discrete time using adaptive fuzzy logic," *Proc. IEEE Conference on Decision and Control*, 2920–2926, Tampa, FL, 1998.

Campos et al., "Backlash compensation in discrete time nonlinear systems using dynamic inversion by neural networks: A preliminary approach," *submitted to the special issue on Developments in Intelligent Control for Industrial Applications of the Int. Journal of Adaptive Control and Signal Processing*, Nov., 1999.

Grundelius and Angelli, "Adaptive control of systems with backlash acting on the input," *Proceedings of the 35$^{th}$ Conference on Decision and Control*, pp. 4689–4694, Kobe, Japan, 1996.

Gullapalli et al., "Acquiring robot skills via reinforcement learning," *IEEE Cont. Syst.*, 13–24, Feb. 1994.

Haddad et al., "Optimal descrete–time control for nonlinear cascade systems," *Proceedings of the American Control Conference*, pp.2175–2176, Alburquerque, NM, 1997.

Han and Zhong, "Robust adaptive control of time–varying systems with unknown backlash nonlinearity," *Proceedings of the American Control Conference*, pp. 763–767, Albuquerque, NM, 1997.

Hornik et al., "Multilayer feedforward networks are universal approximators," *Neural Networks* 2:359–366, 1989.

Ioannou and Datta, "Robust adaptive control: a unified approach," *Proc. IEEE*, 790(12): 1736–1768, 1991.

Jagannathan and Lewis, "Discrete–Time Control of a Class of Nonlinear Dynamical Systems," *Int. Journal of Intelligent Control and Systems*, 1(3): 297–326, 1996.

Jagannathan and Lewis, "Robust backstepping control of robotic systems using neural networks," *J. Intelligent and Robotic Sys.*, 23:105–128, 1998.

Kim et al., "Fuzy precompensation of PID controllers," *Proc. IEEE Conf. Control Applications*, pp. 183–188, Sep. 1993.

Kosko, *Neural Networks and Fuzzy Systems*, Prentice Hall, New Jersey, 1992.

Krstic et al., *Nonlinear and Adaptive Control Design*, John Wiley & Sons, New York, NY, 1995.

Lewis et al., "Neural net robot controller with guaranteed tracking performance," *IEEE Trans. Neural Networks*, 6(3): 703–715, 1995.

Lewis et al., *Control of Robot Manipulators*, MacMillan, New York, 1993.

Sanner and Slotine, "Gaussian networks for direct adaptive control," *IEEE Trans. Neural Networks*, 3: 837–863, 1992.

Selmic and Lewis, "Backlash Compensation in Nonlinear Systems using Dynamic Inversion by Neural Networks," 1163–1168, *IEEE Conference in Control and Automation*, Kona, Hawaii, Aug. 1999.

Selmic and Lewis, "Backlash Compensation in Nonlinear Systems using Dynamic Inversion by Neural Networks" *Asian Journal of Control*, 2(2):76–87, 2000.

Slotine and Li, *Applied Nonlinear Control*, New Jersey: Prentice–Hall, 1991.

Slotine and Li., "Adaptive manipulator control: a case study," *IEEE trans. Automat. Control*, 33(11): 995–1003, 1988.

Tao and Kokotovic, "Adaptive control of plants with unknown dead–zones," *Proceedings American control Conf.*, 2710–2714, Chicago, 1992.

Tao and Kokotovic, "Discrete–time adaptive control of systems with unkown nonsmooth input nonlinearities," *Proceedings of the 33$^{rd}$ Conference on Decision and Control*, 1171–1176, Lake Buena Vista, FL, 1994.

Tao and Kokotovic, *Adaptive Control of Systems with Actuator and Sensor Nonlinearities*, John Wiley & Sons, Inc., New York, 1996.

Tao, "Adaptive backlash compensation for robot control," *Proceedings IFAC World Congress*, 307–312, San Francisco, 1996.

Vandergrift et al., "Adaptive fuzzy logic control of discrete–time dynamical systems," *Proc. IEEE Int. Symp. Intellegent Control*, 395–401, Aug. 1995.

Werbos, "Backpropagation through time: what it does and how to do it," *Proc. IEEE*, 78(10): 1550–1560, 1990.

Webos, "Neurocontrol and Supervised learning: an overview and evalutation," *in Handbook of Intelligent Control*, White and Sofge, Eds. NY: Van Nostrand Reinhold, 1992, pp. 65–89, 1992.

Yeh and Kokotovic, "Adaptive control of a class of nonlinear discrete–time systems," *International Journal of Control*, 62(2): 303–324, 1995.

Zhang et al., "Robust adaptive control of uncertain discrete–time systems," *Automatica*, 321–329, 1999.

Co–pending U.S. Patent Application No. 09/969,549 filed Oct. 2, 2001.

Barron, "Universal approximation bounds for superpositions of a sigmoidal function," *IEEE Trans.Info. Theory*, 39:930–945, 1993.

Chen and Khalil, "Adaptive control of a class of nonlinear discrete–time systems using neural networks," *IEEE Trans. Automat. Cont.*, 40:791–801, 1995.

Corless and Leitmann, "Continuous state feedback guaranteeing uniform ultimate boundedness for uncertain dynamic systems," *IEEE Trans. Automat. Contr.*, AC–26:1139–1144, 1981.

Cybenko, "Approximations by superpositions of a sigmoidal function," *Math. Contr. Signals, Syst.*, 2:303–314, 1989.

Desoer and Shahruz, "Stability of dithered non–linear systems with backlash or hysteresis," *Int. J. Contr.*, 43:1045–1060, 1986.

Igelnik and Pao, "Stochastic Choice of Basis Functions in Adaptive Function Approximation and the Functional–Link Net," *IEEE Trans. Neural Networks*, 6:1320–1329, 1995.

Kim and Calis, "Nonlinear flight control using neural networks," *Journal of Guidance, Control, and Dynamics*, 20:26–33, 1997.

Kim et al., "A two–layered fuzzy logic controller for systems with deadzones," *IEEE Trans. Industrial Electron.*, 41:155–162, 1994.

Kwan et al., "Robust neural–network control of rigid–link electrically driven robots," *IEEE Trans. Neural Networks*, 9:581–588, 1998.

Lee and Kim, "Control of systems with deadzones using neural–network based learning control," *Proc. IEEE Int. Conf. Neural Networks*, pp. 2535–2538, 1994.

Leitner et al., "Analysis of adaptive neural networks for helicopter flight control," *Journal of Guidance, Control, and Dynamics*, 20:972–979, 1997.

Lewis et al., "*Neural Network Control of Robot Manipulators and Nonlinear Systems*", Taylor and Francis, Philadelphia, PA, 1999.

Lewis et al., "Multilayer neural–net robot controller with guaranteed tracking performance," *IEEE Trans. neural Networks*, 7:388–399, 1996.

Li and Cheng, "Adaptive high–precision control of positioning tables–theory and experiment," *IEEE Trans. Control Syst. Technol.*, 2:265–270, 1994.

McFarland and Calise, "Multilayer neural networks and adaptive nonlinear control of agile anti–air missiles," *American Institute of Aeronautis & Astronautics*, 1999.

Narendra and Annaswamy, "a new adaptive law for robust adaptation without persistent excitation," *IEEE Trans. Automat. Control*, AC–32:134–145, 1987.

Narendra, "Adaptive Control Using Neural Networks," *Neural Networks for Control*, Ch. 5, pp. 115–142, ed. W. T. Miller, R. S. Sutton, P. J. Werbos, Cambridge: MIT Press, 1991.

Narendra and Parthasarathy, "Identification and control of dynamical systems using neural networks, " *IEEE Trans. Neural Networks*, 1:4–27, 1990.

Park and Sandberg, "Criteria for the approximation of nonlinear systems," *IEEE Trans. Circuits Syst.–1*, 39:673–676, 1992.

Park and Sandberg, "Nonlinear approximations using elliptic basis function networks," *Circuits, Systems, and Signal Processing*, 13:99–113, 1993.

Polycarpou, "Stable adaptive neural control scheme for nonlinear systems," *IEEE trans. Automat. Cont.*, 41:447–451, 1996.

Recker et al., "Adaptive nonlinear control of systems containing a dead zone," *Proc. IEEE Conf. Decis. Control*, 1991, pp. 2111–2115.

Rovithakis and Christodoulou, "Adaptive control of unkown plants using dynamical neural networks, " *IEEE Trans. Systems Man and Cybernetics*, 24:400–412, 1994.

Sadegh, "A perceptron network for funcitonal identification and control of nonlinear systems," *IEEE Trans. Neural Networks*, 4:982–988, 1993

Sanner and Slotine, "Stable adaptive control and recursive identification using radial gaussian networks," *Proc. IEEE Conf. Decis. Control*, 1829–1833, 1991.

Selmic and Lewis, "Neural network approximation of piecewise continuous functions: application to friction compensation," *PRoc. IEEE Int. Symp. Intell. Contr.*, 1997.

Selmic and Lewis, "Deadzone compensation in motion control systems using neural networks," *IEEE Trans. Automat. Control*, 45:602–613, 2000.

Song et al., "Control of a class of nonlinear uncertain systems via compensated inverse dynamics approach," *IEEE Trans. Automat. Contr.*, 39:1866–1871, 1994.

Selmic and Lewis, "Deadzone compensation in nonlinear systems using neural networks," *IEEE Conf. Decis. Control*, 1998.

Sontag, "Neural networks for control, " in *Essays on Control: Perspectives in the Theory and its Applicaitons* (H.L. Trentelman and J.C. Willems, eds.), birkhauser, 339–380, 1993.

Sontag, "Feedback stabilization using two–hidden–layer nets," *IEEE Trans. Neural Networks*, 3:381–990, 1992.

Tao and Kokotovic, "Adaptive control of plants with unknown dead–zones," *IEEE Trans. Automat. Control*, 39:59–68, 1994.

Tao and Kokotovic, "Continuous–time adaptive control of systems with unknown backlash," *IEEE Trans. Automat. Control*, 40:1083–1087, 1995.

Tzes et al., "Neural network control for DC motor micro-maneuvering," *IEEE Trans. Ind. Electron.*, 42:516–523, 1995.

Yan and Li, "Robot learning control based on recurrent neural network inverse model," *J. Robot Sys.*, 14:199–211, 1997.

Yesildirek and Lewis, "A neural net controller for robots with Hebbian tuning and guaranteed tracking," *Proc. American Control Conference*, Seattle, Washington, pp. 1–6, 1995.

\* cited by examiner

BACKLASH COMPENSATION USING NEURAL NETWORK

The government may own rights to portions of the present invention pursuant to NSF Grant ECS-9521673, Texas ATP Grant 003656-027, and/or ARO Grant DAAD 1999-1-0137.

BACKGROUND OF THE INVENTION

1. Field of the Invention

The present invention relates generally to the fields of neural networks. More particularly, it concerns using neural networks for backlash compensation in mechanical systems.

2. Description of Related Art

A general class of industrial motion control systems has the structure of a dynamical system, usually of the Lagrangian form, preceded by some nonlinearities in the actuator, which may be deadzone, backlash, saturation, or the like. This includes xy-positioning tables, robot manipulators, robots, overhead crane mechanisms, machine tools, vehicle suspension systems, and many more mechanical systems. Problems associated with nonlinearities may be exacerbated when the required accuracy is high, as in micropositioning devices. Due to the nonanalytic nature of actuator nonlinearities and the fact that their exact nonlinear functions are unknown, such systems present a serious challenge for the control design engineer. In particular, inverting backlash nonlinearity even for known backlash models is extremely difficult since the nonlinearity appears in the feedforward path. It would therefore be advantageous to have the ability to both estimate the nonlinearities and compensate for their effects in a mechanical system. It would be especially advantageous to have the ability to estimate and compensate for the effects of backlash in a mechanical system.

Neural Networks (NN) have been used extensively in feedback control systems. Specifically, it has been observed that the use of Proportional-Derivative (PD) controllers may result in limit cycles if actuators have deadzones or backlash. Rigorous results for motion tracking of such systems are notably sparse, though ad hoc techniques relying on simulations for verification of effectiveness are prolific.

Although some NN applications show at least a degree of utility, most applications, unfortunately, are ad hoc with no demonstration of stability. The stability proofs that do exist rely almost invariably on the universal approximation property for NN. However, in most real industrial control systems there are nonsmooth functions (piecewise continuous) for which approximation results in the literature are sparse or nonexistent. Examples of phenomena involving nonsmooth functions include, but are not limited to, deadzone, friction, and backlash. Though there do exist some results for piecewise continuous functions, traditional attempts to approximate jump functions using smooth activation functions require many NN nodes and many training iterations, and still do not yield very good results. It would therefore be advantageous to have the ability to estimate and compensate nonlinearities, including backlash nonlinearities, involving piecewise continuous functions with guaranteed close-loop stability.

Certain problems facing the field enumerated above are not intended to be exhaustive but rather are among many which tend to impair the effectiveness of previously known estimation and compensation schemes. Other noteworthy problems may and do exist; however, those presented above are sufficient to demonstrate that methods of compensation, including backlash compensation, appearing in the art have not been altogether satisfactory.

SUMMARY OF THE INVENTION

The present invention relates to a dynamic inversion compensation scheme for backlash but may be applied for compensation of a large class of invertible dynamical nonlinearities. A general model of backlash is used, which is not required to be symmetric. The compensator of the present invention uses a backstepping technique with neural networks (NN) for inverting backlash nonlinearity in the feedforward path. Compared with adaptive backstepping control schemes, the present disclosure does not require unknown parameters to be linear parametrizable, and no regression matrices are needed. Instead of a derivative, the present invention uses a filtered derivative.

In the detailed disclosure found below, full rigorous stability proofs are given using the filtered derivatives of the present invention. In accordance with the present disclosure, small tracking errors are guaranteed, and bounded NN weights are presented. Also shown below is a detailed analysis using a real filter needed to calculate the derivative of signals used in inverse dynamics design.

The NN of the present invention may be used for compensating dynamic inversion error. A modified Hebbian tuning algorithm for the NN is designed in order to simplify the computational burden in multi-axes mechanical systems with backlash. Although the nonlinear system described herein is assumed to be in Brunovsky form, those having skill in the art will recognize that techniques of the present invention may be applied to different forms as well.

As shown in the Examples section of this disclosure, simulation results show that a NN backlash compensator according to the present invention may significantly reduce the degrading effect of backlash nonlinearity.

The present invention provides for several advantages and offers several features that differentiate it from previously-known methodology. Some of these advantages and features include, but are not limited to, the following:

(1) Most backlash compensators using older control technology do not have any performance or stability guarantees. This makes their acceptance by industry questionable;

(2) Other modern backlash compensators that do not use neural nets, e.g. those based on adaptive control, require a strong "linear in the parameters assumption" that does not often hold for actual industrial systems. This restricts the types of backlashes that can be canceled;

(3) The inventors are not aware of any backlash compensation method based on neural networks. Although there are certain, compensation methods for other actuator nonlinearities (deadzone and friction) based on neural nets, they do not provide design algorithms based on mathematical proofs that guarantee stability of the controlled system. Instead, they use standard 'backpropagation' weight tuning, which cannot provide stability in all situations;

(4) Other backlash compensation techniques based on fuzzy logic use an ad hoc structure that does not have a rigorous stability analysis;

(5) Other dynamic inversion approaches require a non-implementable ideal differentiator. The present invention uses a filter derivative, which is easy to implement; and (6) Other dynamic inversion approaches based on neural networks use more complex tuning algorithms. Hebbian tuning, disclosed herein, is computationally simpler and more suitable for implementation on actual industrial devices.

Noteworthy features of the present invention include, but are not limited to, the following:

(1) The invention is a 'model-free' approach. Specifically, a neural net may be used for backlash compensation so that a mathematical model of the backlash is not needed;

(2) The invention has application for a large class of 'dynamic' actuator nonlinearities, not only backlash;

(3) The neural net design algorithm based on dynamic inversion with rigorous mathematical stability proofs of the present invention shows how to guarantee closed-loop stability and performance;

(4) The modified Hebbian tuning algorithm presented herein offers computational advantages over gradient descent based algorithms. No preliminary off-line tuning is needed. Weights are tuned on-line, and the algorithms guarantee stability of the controlled system;

(5) Neural net weight initialization according to the present invention is simple using algorithms disclosed herein. Weights may be initialized so that the neural net output is zero, and a proportional-derivative (PD) control loop keeps the system stable initially until the weights begin to learn; and (6) A filtered derivative is used in the feedforward loop of this invention, instead of an ideal derivative, which cannot be implemented as in other dynamic inversion approaches.

Potential markets and applications for the present invention are vast and include, but are not limited to, electrical components fabrication, the auto industry, military applications, robotics, mechanical processes, and biomedical engineering.

In one respect, the invention is an adaptive neural network compensator for compensating backlash of a mechanical system. As used herein, by "mechanical system" it is meant any system exhibiting a nonlinearity. Examples of mechanical systems include, but are not limited to, actuators, robots, x-y manipulators, cranes, and any system showing any nonlinearity in response. The compensator includes a feedforward path, a proportional derivative tracking loop, a filter, and a neural network. The proportional derivative tracking loop includes a proportional derivative path in the feedforward path. The filter is in the feedforward path and is configured to take a filtered derivative of a tracking error signal of the compensator to determine a filtered tracking error signal. The neural network is in the feedforward path and is coupled to the filter. The neural network is configured to compensate the backlash by estimating an inverse of the backlash and applying the inverse to an input of the mechanical system.

In other respects, the neural network may be tuned according to the following equations:

$$\dot{\hat{V}} = -T\|\tilde{\tau}\|x_{nn}\hat{\sigma}^T - kT\|\tilde{\tau}\|\hat{V}; \text{ and}$$

$$\dot{\hat{W}} = -S\hat{\sigma}\tilde{\tau}^T - kS\|\tilde{\tau}\|\hat{W},$$

where V-hat represents an estimate of first layer neural network weights, W-hat represents an estimate of second layer neural network weights, Sigma-hat represents an estimate of neural network hidden-layer output, Tau-tilde represents error in an estimate of an input to the mechanical system, $x_{nn}$ represents an input vector to the neural network, S and T are design weighting matrices, and k is a design convergence parameter. The filtered tracking error signal is uniformly ultimately bounded. Stability proofs disclosed herein guarantee the bounded nature of the filtered tracking error signal. The weight estimates of the neural network may be uniformly ultimately bounded. Stability proofs disclosed herein guarantee the bounded nature of the weight estimates. The filtered tracking error signal and weight estimates of the neural network may be uniformly ultimately bounded. Stability proofs disclosed herein guarantee the bounded nature of the filtered tracking error signal and weight estimates together. The proportional derivative tracking loop may be configured to provide stable feedback control of the mechanical system while weights of the neural network are adjusted from initialization values. The mechanical system comprises an actuator or robot.

In another respect, the invention is an adaptive neural network compensator for compensating backlash of a mechanical system, including a filter, a neural network, and means for tuning the neural network. The filter is in a feedforward path and is configured to determine a filtered tracking error signal. The neural network is in the feedforward path and is configured to compensate the backlash by estimating an inverse of the backlash and applying the inverse to an input of the mechanical system. The means for tuning the neural network ensures that the filtered tracking error signal of the compensator is uniformly ultimately bounded.

In another respect, the invention is an adaptive neural network compensator for compensating backlash of a mechanical system, including a feedforward path, a proportional derivative tracking loop, a neural network, and a nonlinear estimate feedback loop. The proportional derivation tracking loop includes a proportional derivative path in the feedforward path. The neural network is in the feedforward path. The nonlinear estimate feedback loop is coupled to the feedforward path.

In another respect, the invention is a method of adaptively compensating backlash in a mechanical system. An inverse of the backlash is estimated using a neural network in a feedforward path. A filtered derivative of a tracking error signal of the compensator is taken using a filter in the feedforward path to form a filtered tracking error signal. Weights of the neural network are adjusted as a function of the filtered tracking error signal using a Hebbian tuning algorithm to achieve closed loop stability. The inverse is applied to an input of the mechanical system to compensate the backlash.

In other respects, initial weights V of the neural network may be selected randomly and initial weights W of the neural network may be set to zero. The method may also include providing stable feedback control of the mechanical system while weights of the neural network are adjusted from initialization values with a proportional derivative tracking loop comprising a proportional derivative path in the feedforward path.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

Let S be a compact simply connected set of $R^n$. With map $f: s \rightarrow R^m$, define $C(S)$ as the space such that f is continuous. The space of functions whose r-th derivative is continuous is denoted by $C^r(S)$, and the space of smooth functions is $C^\infty(S)$.

By $\|\cdot\|$ is denoted any suitable vector norm. When it is required to be specific the p-norm is denoted by $\|\cdot\|_p$. The supremum norm of f(x), over S, is defined as $$\sup_{x \in S} \|f(x)\|, \quad f: S \rightarrow R^m. \tag{2.1}$$

Given $A=[a_{ij}]$, $B \in R^{m \times n}$ the Frobenius norm is defined by $$\|A\|_F^2 = tr(A^T A) = \sum_{i,j} a_{ij}^2, \tag{2.2}$$

with tr( ) the trace. The associated inner product is $<A,B>_F = tr(A^T B)$. The Frobenius norm is compatible with the 2-norm so that $\|Ax\|_2 \leq \|A\|_F \|x\|_2$.

When $x(t) \in R^n$ is a function of time the standard $L_p$ norms are used. It is said that x(t) is bounded if its $L_\infty$ norm is bounded. Matrix $A(t) \in R^{m \times n}$ is bounded if its induced matrix $\infty$-norm is bounded.

Consider the nonlinear system $$\dot{x}=g(x,u,t), \quad y=h(x,t) \tag{2.3}$$

with state $x(t) \in R^n$. The equilibrium point $x_e$ is said to be uniformly ultimately bounded (UUB) if there exists a compact set $S \subset R^n$, so that for all $x_0 \in S$ there exists an $\epsilon > 0$, and a number $T(\epsilon, x_0)$ such that $\|x(t) - x_e\| \leq \epsilon$ for all $t \geq t_0 + T$. That is, after a transition period T, the state x(t) remains within the ball of radius $\epsilon$ around $x_e$.

Neural Networks

Figure 1:
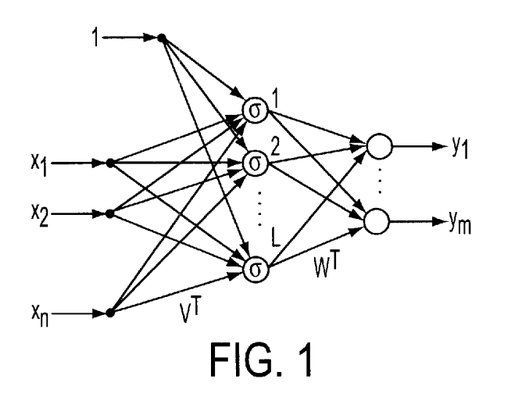
FIG. 1 shows a two-layer neural network (NN) according to one embodiment of the present disclosure.

The two-layer NN in FIG. 1 consists of two layers of tunable weights and has a hidden layer and an output layer. The hidden layer has L neurons, and the output layer has m neurons. The multilayer NN is a nonlinear mapping from input space $R^n$ into output space $R^m$.

In FIG. 1, the NN output y is a vector with m components that are determined in terms of the n components of the input vector x by the equation $$y_i = \rho\left(\sum_{l=1}^{L} w_{il} \sigma\left(\sum_{j=1}^{n} v_{lj} x_j + v_{l0}\right)\right); \quad i = 1, 2, \ldots, m. \tag{2.4}$$

where $\sigma(\cdot)$ are the hidden layer activation functions, $\rho(\cdot)$ are the output layer activation functions and L is the number of hidden-layer neurons. The first-layer interconnection weights are denoted $v_{lj}$ and the second-layer interconnection weights by $w_{il}$. The threshold offsets are denoted by $v_{l0}$.

By collecting all the NN weights $v_{lj}$, $w_{il}$ into matrices $V^T$, $W^T$, the NN equation with linear output activation function $\rho(\cdot)$, may be written in terms of vectors as $$y = W^T \sigma(V^T x). \tag{2.5}$$

The thresholds are included as the first column of the weight matrix $V^T$; to accommodate this, the vector x needs to be augmented by placing a '1' as their first element (e.g. $x = [1 \; x_1 \; x_2 \ldots x_n]^T$). In this equation, to represent (2.4) one has sufficient generality if $\sigma(\cdot)$ is taken as a diagonal function from $R^L$ to $R^L$, that is $\sigma(z) = diag\{\sigma(zl)\}$ for a vector $z = [z_1 \; z_2 \ldots Z_L]^T \in R^L$. For notational convenience the matrix of all the weights is defined as $$Z = \begin{bmatrix} W \\ & V \end{bmatrix}. \tag{2.6}$$

There are many different ways to choose the activation functions $\sigma(\cdot)$, including sigmoid, hyperbolic tangent, etc. The sigmoid activation function may be used, which is given by $$\sigma(x) = \frac{1}{1 + e^{-\beta x}}. \tag{2.7}$$

Many well-known results say that any sufficiently smooth function can be approximated arbitrarily closely on a compact set using a two-layer NN with appropriate weights. For instance, Cybenko's result for continuous function approximation says that given any function $f \in C(S)$, with S compact subset of $R^n$, and any $\epsilon_N > 0$, one has $$f(x) = W^T \sigma(V^T x) + \epsilon(x), \tag{2.8}$$

where the $\epsilon(x)$ is the NN approximation error, and $\|\epsilon(x)\| \leq \epsilon_N$ for $x \in S$. Barron has shown that NN can serve as universal approximators for continuous functions with a fundamental lower bound of order $(1/L)^{2/n}$. The approximating weights V and W are ideal target weights, and it is assumed that they are bounded such that $\|V\|_F \leq V_M$, $\|W\|_F \leq W_M$, or $\|Z\|_F \leq Z_M$.

Learning in the biological nervous system was explained by Hebb through the correlation of a presynaptic signal with a postsynaptic activity. Suppose the NN is to associate the input pattern X to the, output vector Y. Define the output error as e=Y−y, with y the output when x=X. Then, a continuous-time tuning rule based on the Hebbian philosophy is given by $$\dot{W} = \eta \sigma(V^T x) e^T \tag{2.9}$$

$$\dot{V} = \eta X (\sigma(V^T x))^T \tag{2.10}$$

The Hebbian tuning algorithm has not been shown to converge. It has rarely been used for feedback control algorithms, and not to the inventors' knowledge in backlash compensation with proofs of stability.

Backlash Nonlinearity

Here is assumed a general model of the backlash which is not required to be symmetric. A backstepping approach may be used to derive a compensator that has a neural network in the feedforward loop. This method may be applied for compensation of a large class of invertible dynamical nonlinearities.

To focus on backlash compensation, it is assumed that the system is in Brunovsky form, but with the benefit of the present disclosure it will be understood that other forms may be involved. The generality of the method and its applicability to a broad range of nonlinear functions make techniques disclosed herein a useful tool for compensation of backlash, hysteresis, etc. Backlash compensation may be done using dynamic inversion, where NN is used for the dynamic inversion compensation.

Backlash Nonlinearity and Backlash Inverse

Figure 2A:
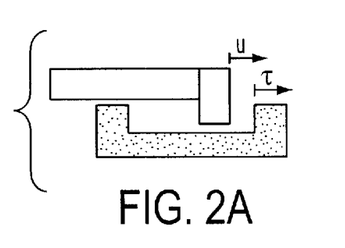
FIGS. 2A and 2B show backlash nonlinearity according to one embodiment of the present disclosure.
Figure 2B:
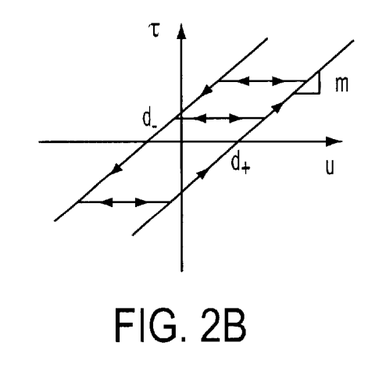

Backlash nonlinearity is shown in FIGS. 2A and 2B, and a mathematical model is given by (3.1).

$$\dot{\tau} = B(\tau, u, \dot{u}) = \begin{cases} m\dot{u}, & \text{if } \dot{u} > 0 \text{ and } \tau = mu - md_+ \\ & \text{if } \dot{u} < 0 \text{ and } \tau = mu - md_- \\ 0, & \text{otherwise} \end{cases} \quad (3.1)$$

One can see that backlash is a first-order velocity-driven dynamic system, with inputs u and $\dot{u}$, and state $\tau$. It contains its own dynamics, therefore its compensation requires the design of dynamic compensator.

Whenever the motion u(t) changes its direction, the motion $\tau(t)$ is delayed from motion of u(t). One objective of a backlash compensator is to make this delay as small as possible, i.e. to make the $\tau(t)$ to closely follow u(t). In order to cancel the effect of backlash in the system, the backlash precompensator needs to generate the inverse of the backlash nonlinearity. The backlash inverse function is shown in FIG. 3.

The dynamics of the NN backlash compensator is given by $$\dot{u} = B_{inv}(u, w, \dot{w}). \quad (3.2)$$

Figures 3, 4A, 4B:
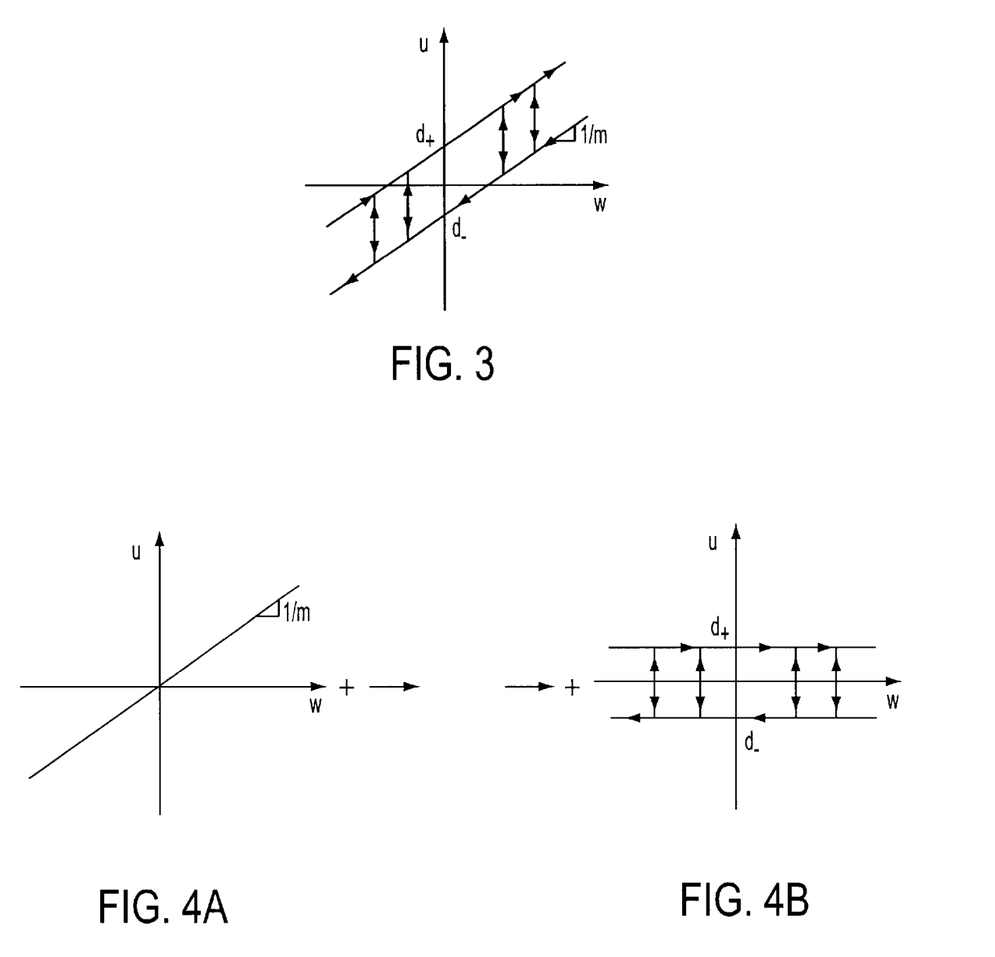
FIG. 3 shows a backlash inverse according to one embodiment of the present disclosure.
FIGS. 4A and 4B show backlash inverse decomposition according to one embodiment of the present disclosure.

The backlash inverse characteristic shown in the FIG. 3 may be decomposed into two functions: a direct feedforward term plus the additional modified backlash inverse term as shown in the FIGS. 4A and 4B. This decomposition allows design of a compensator that has a better structure.

NN Controller With Backlash Compensation

A NN backlash compensator may be designed using the backstepping technique originally developed by Krstic et al. and explained in M. Krstic, I. Kanellakopoulos, and P. Kokotovic, Nonlinear and Adaptive Control Design, John Wiley & Sons, New York, N.Y., 1995, which is hereby incorporated by reference. Below, it is shown how to tune or learn the weights of the NN on-line so that the tracking error is guaranteed small and all internal states (e.g. the NN weights) are bounded. It is assumed that the actuator output $\tau(t)$ is measurable. A modified Hebbian tuning algorithm is presented for the NN backlash compensator that yields a stable closed-loop system. Using this method brings a relatively simple adaptation structure and offers computational advantages over gradient descent based algorithms. There is no need to compute a sensitivity matrix that uses the partial derivative of the unknown plant's output with respect to its input, nor an extra feedforward term and the jacobian matrix of the hidden layer with respect to its input as in backpropagation-based tuning approaches.

Dynamics of Nonlinear Motion Systems

The dynamics of a large class of single-input nonlinear systems may be written in the Brunovsky form:

$$\dot{x}_1 = x_2, \dot{x}_2 = x_3 \ldots \dot{x}_n = f(x) + \tau_d + \tau, y = x_1 \quad (4.1)$$

where the output is y(t), the state is $x \equiv [x_1\ x_2\ \ldots\ x_n]^T$, $\tau_d$ is a disturbance, $\tau(t)$ is actuator output, and function f(x) represents system nonlinearities like friction, etc. The actuator output $\tau(t)$ is related to the control input u(t) through the backlash nonlinearity. Therefore overall dynamics of the system includes (4.1) and backlash dynamics (3.1).

The following assumptions are needed. They are typical assumptions commonly made in the literature and hold for many practical systems.

Assumption 1 (Bounded disturbance). The unknown disturbance satisfies $\|\tau_d\| \leq \tau_M$, with $\tau_M(t)$ a known positive constant.

Assumption 2 (Bounded estimation error). The nonlinear function f(x) is assumed to be unknown, but a fixed estimate $\hat{f}(x)$ is assumed known such that the functional estimation error, $\tilde{f}(x) = f(x) - \hat{f}(x)$, satisfies $$\|\tilde{f}(x)\| \leq f_M(x), \quad (4.2)$$

for some known bounding function $f_M(x)$.

This is not unreasonable, as in practical systems the bound $f_M(x)$ can be computed knowing the upper bound on payload masses, frictional effects, and so on.

To design a motion controller that causes the system output, y(t), to track a smooth prescribed trajectory, $y_d(t)$ (as used herein, the subscript 'd' shall refer to 'desired,' such as a desired state), the desired state may be defined as:

$$x_d(t) = [y_d\ \dot{y}_d\ \ldots\ y_d^{(n-1)}]^T, \quad (4.3)$$

with $y_d^{(n-1)}$ the (n−1)-st derivative. The tracking error may be defined by:

$$e = x - x_d, \quad (4.4)$$

and the filtered tracking error by:

$$r = [\lambda_1 \lambda_2\ \ldots\ \lambda_{n-1}\ 1]e = [\Lambda^T 1]e, \quad (4.5)$$

with $\Lambda$ a gain parameter vector selected so that $e(t) \to 0$ exponentially as $r(t) \to 0$. Then, (4.5) is stable system so that e(t) is bounded as long as controller guaranties that the filtered error r(t) is bounded.

Differentiating (4.5) and invoking (4.1), it can be seen that the dynamics are expressed in terms of filtered error as $$\dot{r} = f(x) + Y_d + \tau_d + \tau, \quad (4.6)$$

where $$Y_d = -y_d^{(n)} + [0\Lambda^T]e \quad (4.7)$$

is known function of the desired trajectory and actual states.

Assumption 3 (Bounded desired trajectory). The desired trajectory is bounded so that $$\|x_d(t)\| \leq X_d, \quad (4.8)$$

where $X_d$ is a known constant.

Backstepping Controller Design With NN Backlash Compensation

A robust compensation scheme for unknown terms in f(x) may be provided by selecting the tracking controller $$\tau_{des} = -K_v r - \hat{f}(x) - Y_d + v_1, \quad (4.9)$$

with $\hat{f}(x)$ an estimate for the nonlinear terms f(x), and $v_1(t)$ a robustifying term to be selected for the disturbance rejection. The feedback gain matrix $K_v > 0$ is often selected diagonal. In one embodiment, the estimate $\hat{f}(x)$ is fixed and will not be adapted, as is common in robust control techniques. If f(x) in (4.1) is unknown, it may be estimated using adaptive control techniques or by neural net controllers as is known in the art.

The next theorem is one of the first steps in backstepping design; it shows that the desired control law (4.9) will keep the filtered tracking error small. In Theorem 2 it will be shown how to design the NN controller so the actual control law approaches the desired $\tau_{des}$, still keeping the NN approximation error weights bounded.

Theorem 1 (Control Law for Outer Tracking Loop) Given the system (4.1) and Assumptions 1–2, select the tracking control law (4.9). Choose the robustifying signal $v_1$ as $$v_1(t) = -(f_M(x) + \tau_M)\frac{r}{\|r\|}. \quad (4.10)$$

Then the filtered tracking error r(t) is uniformly ultimately bounded (UUB) and it can be kept as small as desired by increasing the gains $K_v$.

Proof: Select the Lyapunov function candidate $$L_1 = \frac{1}{2}r^T r. \quad (4.11)$$

Differentiating $L_1$ and using (4.6) yields $$\dot{L}_1 r^T (f(x) + Y_d + \tau_d + \tau_{des}). \quad (4.12)$$

Applying the tracking control law (4.9) one has $$\dot{L}_1 = r^T (f(x) + Y_d + \tau_d - K_v r - \hat{f}(x) - Y_d + v_1) \quad (4.13)$$

$$\dot{L}_1 = r^T (\tilde{f}(x) + \tau_d - K_v r + v_1). \quad (4.14)$$

$$\dot{L}_1 = -r^T K_v r + r^T \left( \tilde{f}(x) + \tau_d - (f_M(x) + \tau_M)\frac{r}{\|r\|} \right). \quad (4.15)$$

Expression (4.15) can be bounded as $$\dot{L}_1 \leq -K_{V\,min}\|r\|^2 - \|r\|(f_M + \tau_M) + \|r\|\|\tilde{f} + \tau_d\|, \quad (4.16)$$

Using Assumptions 1 and 2, one can conclude that $\dot{L}_1$ is guaranteed negative for as long as $\|r\| \neq 0$.

NN Backlash Compensation Using Dynamic Inversion

In the Theorem 1 is given a control law that ensures stability in terms of the filtered tracking error. In the presence of the unknown backlash nonlinearity, the desired and actual value of the control signal $\tau$ will be different. Following the idea of dynamic inversion where neural network is used for compensation of the inversion error, originally given by Calise et al. (and explained in (a) B. S. Kim and A. J. Calise, "Nonlinear flight control using neural networks," Journal of Guidance, Control, and Dynamics, vol. 20, no. 1, January–February, 1997; (b) J. Leitner, A. Calise and J. V. R. Prasad, "Analysis of adaptive neural networks for helicopter flight control," Journal of Guidance, Control, and Dynamics, vol. 20, no. 5, pp. 972–979, September–October. 1997; and (c) M. B. McFarland and A. J. Calise, "Multilayer neural networks and adaptive nonlinear control of agile anti-air missiles," Preprint, 1999, all of which are incorporated herein by reference), a rigorous analysis of the closed-loop system stability may be given. In the backstepping and dynamic inversion approach there is deficiency that the derivative of the desired input is required. It usually assumes the pure differentiation. This problem may be solved, however, by applying the real filter instead of pure differentiator, and still rigorously prove the system stability.

The actuator output given by (4.9) is the desired, ideal signal. In order to find the complete system error dynamics define the error between the desired and actual actuator outputs as $$\tilde{\tau} = \tau_{des} - \tau. \quad (4.17)$$

Differentiating, one has $$\dot{\tilde{\tau}} = \dot{\tau}_{des} - \dot{\tau} \quad (4.18)$$
$$= \dot{\tau}_{des} - B(\tau, u, \dot{u})$$

which together with (4.6) and involving (4.9) represent the complete system error dynamics. The goal of the second step in backstepping controller design is to ensure that actual actuator output follows desired actuator output even in the presence of the backlash nonlinearity, thus achieving the backlash compensation.

The dynamics of the backlash nonlinearity may be written as $$\dot{\tau} = \phi \quad (4.19)$$

$$\phi = B(\tau, u, \dot{u}) \quad (4.20)$$

where $\phi(t)$ is pseudo-control input. In the case of known backlash, the ideal backlash inverse is given by $$\dot{u} = B^{-1}(u, \tau, \phi). \quad (4.21)$$

Since the backlash and therefore its inverse are not known, one can only approximate the backlash inverse $$\dot{\hat{u}} = \hat{B}^{-1}(\hat{u}, \tau, \hat{\phi}). \quad (4.22)$$

The backlash dynamics can now be written as $$\dot{\tau} = B(\tau, \hat{u}, \dot{\hat{u}}) \quad (4.23)$$
$$= \hat{B}(\tau, \hat{u}, \dot{\hat{u}}) + \tilde{B}(\tau, \hat{u}, \dot{\hat{u}}),$$
$$= \hat{\phi} + \tilde{B}(\tau, \hat{u}, \dot{\hat{u}})$$

where $\hat{\phi} = \hat{B}(\tau, \hat{u}, \dot{\hat{u}})$ and therefore its inverse $\dot{\hat{u}} = \hat{B}^{-1}(\tau, \hat{u}, \hat{\phi})$. The unknown function $\tilde{B}(\tau, \hat{u}, \dot{\hat{u}})$, which represents the backlash inversion error, will be approximated using neural network.

Define $\hat{V}$, $\hat{W}$ as estimates of the ideal NN weights, which are given by the NN tuning algorithms. In order to design the stable closed-loop system with backlash compensation, one selects the nominal backlash inverse $\hat{u}=\hat{\phi}$ and pseudo-control input $\hat{\phi}$ as $$\hat{\phi}=K_b\tilde{\tau}+\xi-y_{nn}+v_2, \quad (4.24)$$

where $\xi$ is the filter output, $v_2(t)$ is a robustifying term detailed later, and $y_{nn}$ is the output of the neural network $$y_{nn}=\hat{W}^T\sigma(\hat{V}^T x_{nn}), \quad (4.25)$$

The dynamics of the filter is given by $$\dot{\xi}+a\xi=a\dot{\tau}_{des}, \quad (4.26)$$

where a is the filter pole. Output of the filter is then given by $$\xi = \dot{\tau}_{des} - \frac{1}{a}\dot{\xi}, \quad (4.27)$$

which gives the input $\hat{\phi}$ as $$\hat{\varphi} = K_b\tilde{\tau} + \dot{\tau}_{des} - \frac{1}{a}\dot{\xi} - y_{nn} + v_2. \quad (4.28)$$

Using the proposed controller (4.24), the error dynamics (4.18) can be written as $$\dot{\tilde{\tau}} = \dot{\tau}_{des} - \hat{\varphi} - \tilde{B}(\tau, \hat{u}, \dot{\hat{u}}) \quad (4.29)$$
$$= -K_b\tilde{\tau} + \frac{1}{a}\dot{\xi} + y_{nn} - v_2 - \tilde{B}(\tau, \hat{u}, \dot{\hat{u}})$$

Based on the NN approximation property, the backlash inversion error plus the part of the filter dynamics can be represented as $$\tilde{B}(\tau, \hat{u}, \dot{\hat{u}}) - \frac{1}{a}\dot{\xi} = W^T\sigma(V^T x_{nn}) + \varepsilon(x), \quad (4.30)$$

where $\epsilon(x)$ is the NN approximation error and is bounded on a compact set. Sandberg et al. and Sontag (explained in J. Park and I. W. Sandberg, "Nonlinear approximations using elliptic basis function networks," Circuits, Systems, and Signal Processing, vol. 13, no. 1, pp. 99–113, 1993; E. D. Sontag, "Neural networks for control," in Essays on Control: Perspectives in the Theory and its Applications (H. L. Trentelman and J. C. Willems, eds.), Birkhauser, Boston, 1993, pp. 339–380; and E. D. Sontag, "Feedback stabilization using two-hidden-layer nets," IEEE Trans. Neural Networks, 3, pp. 981–990, 1992, all three of which are hereby incorporated by reference) have shown that such NN can be used for approximation of piecewise continuous functions. The NN input vector is chosen as $$x_{nn}=[1\, r^T x_d^T \tau^T \tau y_{nn} \|\hat{Z}\|_F]^T, \quad (4.31)$$

Note that from (4.31) the network output is also the NN input. This requires the fixed-point solution assumption, which holds for bounded sigmoidal activation functions.

Define the weight estimation errors as $$\tilde{V}=V-\hat{V}, \; \tilde{W}=W-\hat{W}, \; \tilde{Z}=Z-\hat{Z}, \quad (4.32)$$

and the hidden-layer output error for a given x as $$\tilde{\sigma}=\sigma-\hat{\sigma}=\sigma(V^T x_{nn})-\sigma(\hat{V}^T x_{nn}) \quad (4.33)$$

Figure 5:
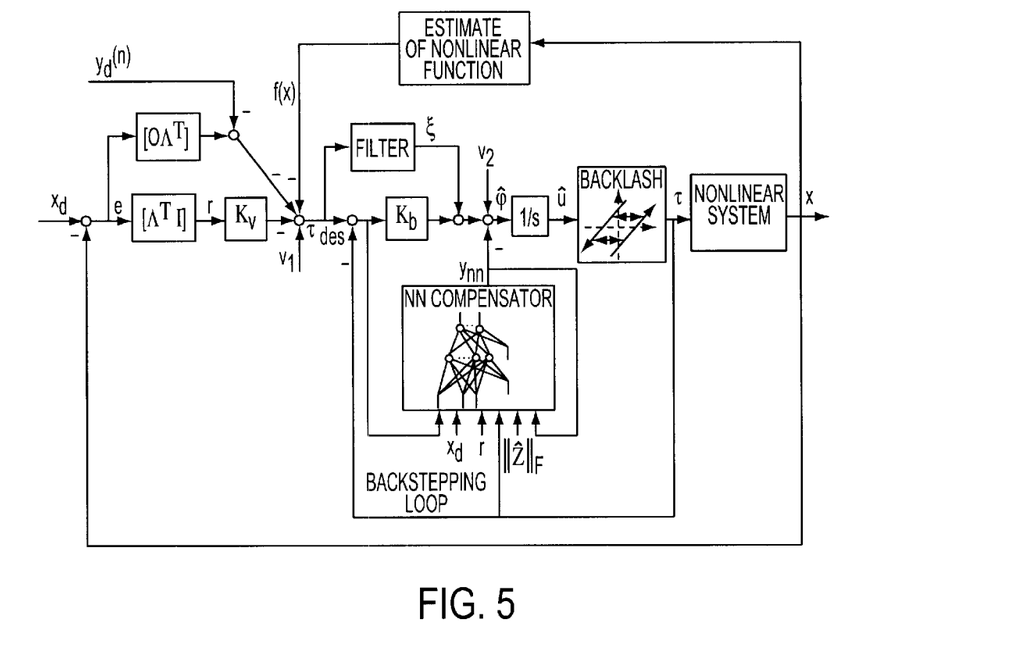
FIG. 5 shows a NN backlash compensator according to one embodiment of the present disclosure.

FIG. 5 shows a closed-loop system with NN backlash compensator according to one embodiment of the present disclosure. Shown in FIG. 5 are schematic representations of the methodology described herein. FIG. 5 shows a feedforward path that is indicated generally by a dashed line, but which encompassing the entire feedforward section of the compensator leading from the input to the output. Also shown is a nonlinear estimate feedback loop coupled to the feedforward path, a backstepping loop, and a proportional derivative (PD) tracking loop.

The backlash compensation scheme of FIG. 5 is in accordance with the backlash inverse decomposition shown in FIGS. 4A and 4B, i.e. the exact backlash inverse includes a direct feed term plus the error term in FIG. 4B, which is estimated by NN.

Substituting matrix expressions for NN, the error dynamics (4.29) can be written as $$\dot{\tilde{\tau}}=-K_b\tilde{\tau}+\hat{W}^T\sigma(\hat{V}^T x_{nn})-v_2-W^T\sigma(V^T x_{nn})-\epsilon(x) \quad (4.34)$$

More appropriately, the error dynamics can be written as:

$$\dot{\tilde{\tau}}=-K_b\tilde{\tau}+\hat{W}^T\sigma(\hat{V}^T x_{nn})+W^T\sigma(\hat{V}^T x_{nn})-W^T\sigma(\hat{V}^T x_{nn})-v_2-W^T\sigma(V^T x_{nn})-\epsilon(x), \quad (4.35)$$

$$\dot{\tilde{\tau}}=-K_b\tilde{\tau}-\tilde{W}^T\hat{\sigma}-W^T\tilde{\sigma}-v_2-\epsilon(x). \quad (4.36)$$

The NN input is bounded by $$\|x_{nn}\|\leq c_0+\|r\|+X_d+\|\tilde{\tau}\|+c_1\|\tilde{Z}\|_F. \quad (4.37)$$

The next theorem shows how to tune the neural network weights so the tracking errors $r(t)$ and $\tau(t)$ achieve small values while the NN weights $\hat{V}$, $\hat{W}$ are close to V, W, i.e. the weight estimation errors defined by (4.32) are bounded.

Theorem 2 (Control Law for Backstepping Loop)

Let assumptions 1, 2 hold. Let the desired trajectories be bounded. Select the control input as (4.24). Choose the robustifying signal $v_2$ as:

$$v_2 = K_{Z_1}(\|\hat{Z}\|_F + Z_M)\left(\tilde{\tau}+\|r\|\frac{\tilde{\tau}}{\|\tilde{\tau}\|}\right)+ \quad (4.28)$$
$$K_{Z_2}\|r\|\frac{\tilde{\tau}}{\|\tilde{\tau}\|}+K_{Z_3}(\|\hat{Z}\|_F+Z_M)^2\frac{\tilde{\tau}}{\|\tilde{\tau}\|},$$

where $K_{Z_1}>\sqrt{L}$, $K_{Z_2}>1$ and $K_{Z_3}>c_1\sqrt{L}$, where the L is the number of hidden layer nodes. Let the estimated NN weights be provided by the NN tuning algorithm $$\dot{\hat{V}}=-T\|\tilde{\tau}\|x_{nn}\hat{\sigma}^T-kT\|\tilde{\tau}\|\hat{V}, \quad (4.39)$$

$$\dot{\hat{W}}=-S\hat{\sigma}\tilde{\tau}^T-kS\|\tilde{\tau}\|\hat{W}, \quad (4.40)$$

with any constant matrices $S=S^T>0$, $T=T^T>0$, and k>0 small scalar design parameter. Then the filtered tracking error $r(t)$, error $\tau(t)$ and NN weight estimates $\hat{V}$, $\hat{W}$ are UUB, with bounds given by (4.55), (4.56). Moreover, the error $\tau(t)$ can be made arbitrarily small by increasing the gain $K_b$.

Proof: Select the Lyapunov function candidate $$L = L_1 + \frac{1}{2}\tilde{r}^T\tilde{r} + \frac{1}{2}tr(\tilde{W}^T S^{-1}\tilde{W}) + \frac{1}{2}tr(\tilde{V}^T T^{-1}\tilde{V}), \quad (4.41)$$

which weights both errors r(t) and τ(t), and NN weights estimation errors. Taking derivative $$\dot{L} = \dot{L}_1 + \tilde{\tau}^T\dot{\tilde{\tau}} + tr(\tilde{W}^T S^{-1}\dot{\tilde{W}}) + tr(\tilde{V}^T T^{-1}\dot{\tilde{V}}), \quad (4.42)$$

and using (4.6) and (4.36) one has $$\dot{L} = r^T(f(x) + Y_d + \tau_d + \tau) + \tau^T(-K_b\tilde{\tau} - \tilde{W}^T\hat{\sigma} - W^T\tilde{\sigma} - v_2 - \epsilon(x))$$

$$+ tr(\tilde{W}^T S^{-1}\dot{\tilde{W}}) + tr(\tilde{V}^T T^{-1}\dot{\tilde{V}}), \quad (4.43)$$

$$\dot{L} = r^T(f(x) + Y_d + \tau_d + \tau_{des}) - r^T\tau + \tau^T(-K_b\tilde{\tau} - \tilde{W}^T\hat{\sigma} - W^T\tilde{\sigma} - v_2 - \epsilon(x))$$

$$+ tr(\tilde{W}^T S^{-1}\dot{\tilde{W}}) + tr(\tilde{V}^T T^{-1}\dot{\tilde{V}}), \quad (4.44)$$

$$\dot{L} = r^T(f(x) + Y_d + \tau_d + \tau_{des}) - r^T\tau + \tau^T(-K_b\tilde{\tau} - v_2 - \epsilon(x))$$

$$- \tau^T W^T\tilde{\sigma} + tr[\tilde{W}^T(S^{-1}\dot{\tilde{W}} - \hat{\sigma}\tilde{\tau}^T)] + tr(\tilde{V}^T T^{-1}\dot{\tilde{V}}). \quad (4.45)$$

Applying (4.9) and tuning rules yields $$\dot{L} r^T(f(x) + \tau_d - K_v r + v_1) - r^T\tilde{\tau} + \tau^T(-K_b\tilde{\tau} - v_2 - \epsilon(x))$$

$$- \tau^T W^T\tilde{\sigma} + k\|\tilde{\tau}\|tr[\tilde{W}^T(W - \tilde{W})] + k\|\tilde{\tau}\|tr[\tilde{V}^T(V - \tilde{V})] - \|\tau\|tr[\tilde{V}^T x_{nn}\hat{\sigma}^T]. \quad (4.46)$$

Using the same inequality as for (4.15) and (4.38), expression (4.46) can be bounded as $$\dot{L} \leq -K_{V\ min}\|r\|^2 - \|r\|(f_M + \tau_M) + \|r\|\|\tilde{f} + \tau_d\| + \quad (4.47)$$

$$k\|\tilde{\tau}\|\|\tilde{Z}\|_F(Z_M - \|\tilde{Z}\|_F) - r^T\tilde{\tau} - K_{b\ min}\|\tilde{\tau}\|^2 - \tilde{\tau}^T\varepsilon(x) -$$

$$\tilde{\tau}^T K_{Z_1}(\|\tilde{Z}\|_F + Z_M)\left(\tilde{\tau} + \|r\|\frac{\tilde{\tau}}{\|\tilde{\tau}\|}\right) - \tilde{\tau}^T K_{Z_2}\|r\|\frac{\tilde{\tau}}{\|\tilde{\tau}\|} -$$

$$\tilde{\tau}^T K_{Z_3}(\|\tilde{Z}\|_F + Z_M)^2\frac{\tilde{\tau}}{\|\tilde{\tau}\|} - \tilde{\tau}^T W^T\tilde{\sigma} - \|\tilde{\tau}\|tr[\tilde{V}^T x_{nn}\hat{\sigma}^T]$$

Including (4.37) and applying some norm properties, one has $$\dot{L} \leq -K_{V\ min}\|r\|^2 - \|r\|(f_M + \tau_M) + \|r\|\|\tilde{f} + \tau_d\| + k\|\tilde{\tau}\|\|\tilde{Z}\|_F(Z_M - \|\tilde{Z}\|_F) - K_{b\ min}\|\tilde{\tau}\|^2$$

$$+ \|\tilde{\tau}\|\|r\| + \|\tilde{\tau}\|\epsilon(x)\| + 2\|\tilde{\tau}\|Z_M\sqrt{L} + \|\tilde{\tau}\|\|\tilde{Z}\|_F\|x_{nn}\hat{\sigma}^T\|$$

$$- K_{Z_1}\|\tilde{\tau}\|^2\|\tilde{Z}\|_F - K_{Z_1}\|\tilde{\tau}\|\|r\|\|\tilde{Z}\|_F - K_{Z_2}\|\tilde{\tau}\|\|r\| - K_{Z_3}\|\tilde{\tau}\|\|\tilde{Z}\|_F^2, \quad (4.48)$$

$$\dot{L} \leq -K_{V\ min}\|r\|^2 + k\|\tilde{\tau}\|\|\tilde{Z}\|_F(Z_M - \|\tilde{Z}\|_F) - K_{b\ min}\|\tilde{\tau}\|^2$$

$$+ \|\tilde{\tau}\|\|r\| + \|\tilde{\tau}\|\epsilon_N + 2\|\tilde{\tau}\|Z_M\sqrt{L} + \|\tilde{\tau}\|\|\tilde{Z}\|_F\sqrt{L}(c_0 + \|r\| + X_d + \|\tilde{\tau}\| + c_1\|\tilde{Z}\|_F)$$

$$- K_{Z_1}\|\tilde{\tau}\|^2\|\tilde{Z}\|_F - K_{Z_1}\|\tilde{\tau}\|\|r\|\|\tilde{Z}\|_F - K_{Z_2}\|\tilde{\tau}\|\|r\| - K_{Z_3}\|\tilde{\tau}\|\|\tilde{Z}\|_F^2. \quad (4.49)$$

$$\dot{L} \leq -K_{V\ min}\|r\|^2 + k\|\tilde{\tau}\|\|\tilde{Z}\|_F(Z_M\|\tilde{Z}\|_F) - K_{b\ min}\|\tilde{\tau}\|^2$$

$$+ \|\tilde{\tau}\|\|r\| + C_0\|\tilde{\tau}\| + C_1\|\tilde{\tau}\|\|\tilde{Z}\|_F + \sqrt{L}\|\tilde{\tau}\|\|r\|\|\tilde{Z}\|_F + \sqrt{L}\|\tilde{\tau}\|^2\|\tilde{Z}\|_F c_1\sqrt{L}\|\tilde{\tau}\|\|\tilde{Z}\|_F^2$$

$$- K_{Z_1}\|\tilde{\tau}\|^2\|\tilde{Z}\|_F - K_{Z_1}\|\tilde{\tau}\|\|r\|\|\tilde{Z}\|_F - K_{Z_2}\|\tilde{\tau}\|\|r\| - K_{Z_3}\|\tilde{\tau}\|\|\tilde{Z}\|_F^2, \quad (4.50)$$

where $C_0 = \epsilon_N + 2Z_M\sqrt{L}$, $C_1 = \sqrt{L}c_0 + X_d$. Therefore, one has the following inequality $$\dot{L} \leq -K_{V\ min}\|r\|^2 - K_{b\ min}\|\tilde{\tau}\|^2 - k\|\tilde{\tau}\|\|\tilde{Z}\|_F^2 + kZ_M\|\tilde{\tau}\|\|\tilde{Z}\|_F$$

$$+ C_0\|\tilde{\tau}\| + C_1\|\tilde{\tau}\|\|\tilde{Z}\|_F + \|\tilde{\tau}\|\|r\| + \sqrt{L}\|\tilde{\tau}\|\|r\|\|\tilde{Z}\|_F + \sqrt{L}\|\tilde{\tau}\|^2\|\tilde{Z}\|_F + c_1\sqrt{L}\|\tilde{\tau}\|\|\tilde{Z}\|_F^2$$

$$- K_{Z_1}\|\tilde{\tau}\|^2\|\tilde{Z}\|_F - K_{Z_1}\|\tilde{\tau}\|\|r\|\|\tilde{Z}\|_F - K_{Z_2}\|\tilde{\tau}\|\|r\| - K_{Z_3}\|\tilde{\tau}\|\|\tilde{Z}\|_F^2. \quad (4.51)$$

Taking $K_{Z_1} > \sqrt{L}$, $K_{Z_2} > 1$, and $K_{Z_3} > c_1\sqrt{L}$ yields $$\dot{L} \leq -K_{V\ min}\|r\|^2 - K_{b\ min}\|\tilde{\tau}\|^2 - k\|\tilde{\tau}\|\|\tilde{Z}\|_F^2 kZ_M\|\tilde{\tau}\|\|\tilde{Z}\|_F + C_0\|\tilde{\tau}\| + C_1\|\tilde{\tau}\|\|\tilde{Z}\|_F \quad (4.52)$$

$$\dot{L} \leq -K_{V\ min}\|r\|^2 - \|\tilde{\tau}\|(K_{b\ min}\|\tilde{\tau}\| + k\|\tilde{Z}\|_F^2 - (kZ_M + C_1)\|\tilde{Z}\|_F - C_0). \quad (4.53)$$

Completing the squares yields $$\dot{L} \leq -K_{V\ min}\|r\|^2 - \|\tilde{\tau}\|\left[K_{b\ min}\|\tilde{\tau}\| + \quad (4.54)\right.$$

$$\left. k\left(\|\tilde{Z}\|_F - \left(\frac{Z_M k + C_1}{2k}\right)\right)^2 - k\left(\frac{Z_M k + C_1}{2k}\right)^2 - C_0\right].$$

Thus, the $\dot{L}$ is negative as long as $$\|\tilde{\tau}\| > \frac{k\left(\frac{Z_M k + C_1}{2k}\right)^2 + C_0}{K_{b\ min}} \quad (4.55)$$

$$\|\tilde{Z}\|_F > \frac{Z_M k + C_1}{2k} + \sqrt{\left(\frac{Z_M k + C_1}{2k}\right)^2 + \frac{C_0}{k}} \quad (4.56)$$

The first terms of (4.39), (4.40) are modified versions of the standard Hebbian tuning law. The k terms correspond to the e-modification, to guarantee bounded parameter estimates. These algorithms do not require computation of the sensitivity matrix, nor Jacobian matrix. The tuning rules provide simple NN design and a great computational advantage especially when the net size is large. Note that robustifying term consists of three terms. The second term is given to ensure the stability due to the error $\tau = \tau_{des} - \tau$ in the backstepping design.

The right-hand side of (4.55) can be taken as a practical bound on the error in the sense that τ(t) will never stay far above it. Note that the stability radius may be decreased any amount by increasing the gain $K_b$. It is noted that PD control without backlash compensation requires much higher gain in order to achieve the similar performance that is, eliminating the NN feedforward compensator will result in degraded performance. Moreover, it is difficult to guarantee the stability of such highly nonlinear system using only PD. Using the NN backlash compensation, stability of the system is proven, and the tracking error can be kept arbitrarily small by increasing the gain $K_b$. The NN weight errors are fundamentally bounded in terms of $V_M$, $W_M$.

Due to the form of the feedforward compensator, which has a unity feedforward path plus a NN parallel path, it is straightforward to initialize the NN weights. The initial weights V are selected randomly, while the initial weights W are set to zero. Then the PD loop with unity gain feedforward path holds the system stable until the NN begins to learn.

The following examples are included to demonstrate specific embodiments of the present disclosure. It should be appreciated by those of skill in the art that the techniques disclosed in the examples which follow represent techniques discovered by the inventor to function well in the practice of the invention. However, those of skill in the art should, in light of the present disclosure, appreciate that many changes may be made in specific embodiments that are disclosed and still obtain a like or similar result without departing from the spirit and scope of the invention.

EXAMPLE 1

Simulation of NN Backlash Compensator

To illustrate the performance of the NN backlash compensator, the following nonlinear system is considered:

$$\dot{x}_1 = x_2 \qquad (5.1)$$
$$\dot{x}_2 = -\frac{1}{T}x_2 + Max_2^2\sin(x_1) + Mga\cos(x_1) + \tau$$

which represents a mechanical motion of robot-like system with one link. The motor time constant is T, M is a net effective load mass, a a length, and g the gravitational constant. We selected T=1 s; M=1 kg; a=2.5 m. The input t is passed through the additional backlash nonlinearity given by Equation (3.1). The parameters of the backlash are $d_+$=10, $d_-$=−10.5, m=1.

The NN weight tuning parameters are chosen as S=10$I_{11}$, T=10$I_6$, k=0.001, where $I_N$ is N×N identity matrix. The robustifying signal gains are $K_{z1}$=5, $K_{z2}$=2, $K_{z3}$=7. The controller parameters are chosen as $\Lambda$=10, $K_v$=10, $K_b$=50.

The NN has L=10 hidden-layer nodes with sigmoidal activation functions. The first-layer weights V are initialized randomly. They are uniformly randomly distributed between −1 and 1. Second-layer weights W are initialized at zero. Note that this weight initialization will not affect system stability since the weights W are initialized at zero, and therefore there is initially no input to the system except for the PD loop. Filter that generates the signal $\tau_{des}$ is implemented as $$\frac{s}{s+100}.$$

Figure 6:
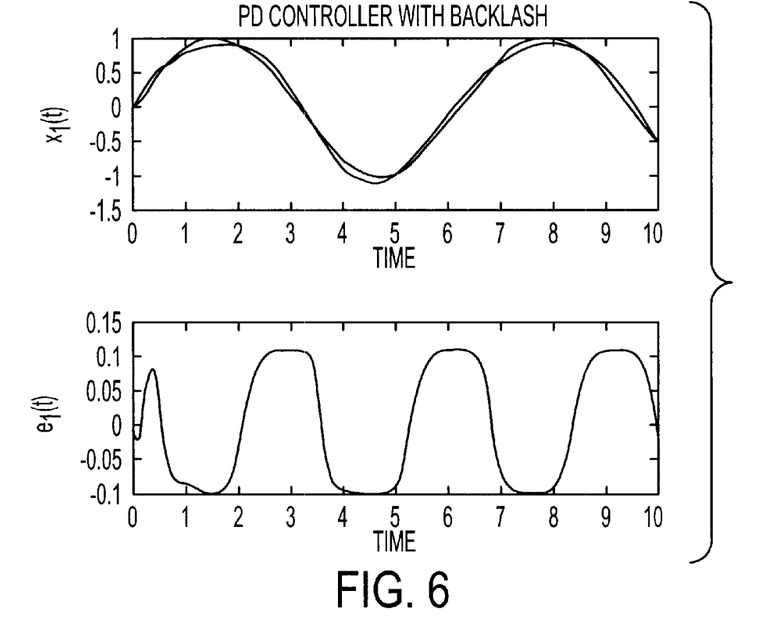
FIG. 6 is a graph showing state $x_1(t)$ and tracking error $e_1(t)$ without backlash compensation.
Figure 7:
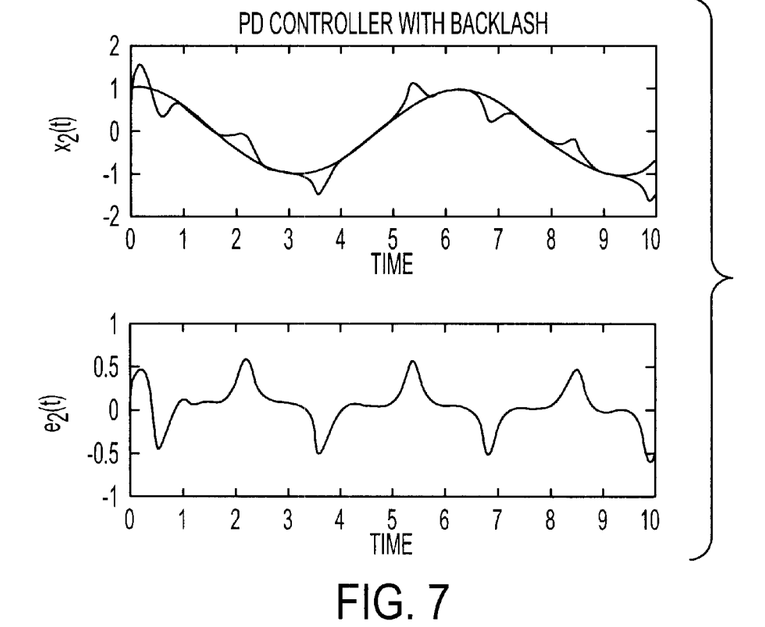
FIG. 7 is a graph showing state $x_2(t)$ and tracking error $e_2(t)$ without backlash compensation.

FIGS. 6 and 7 show the tracking performance of the closed-loop system without the NN backlash compensation. It can be seen that backlash degrades the system performance, since it causes the lost of information about the control signal u(t), whenever u(t) change its direction. Desired trajectory which is shown in the FIGS. is sin(t).

Figure 8:
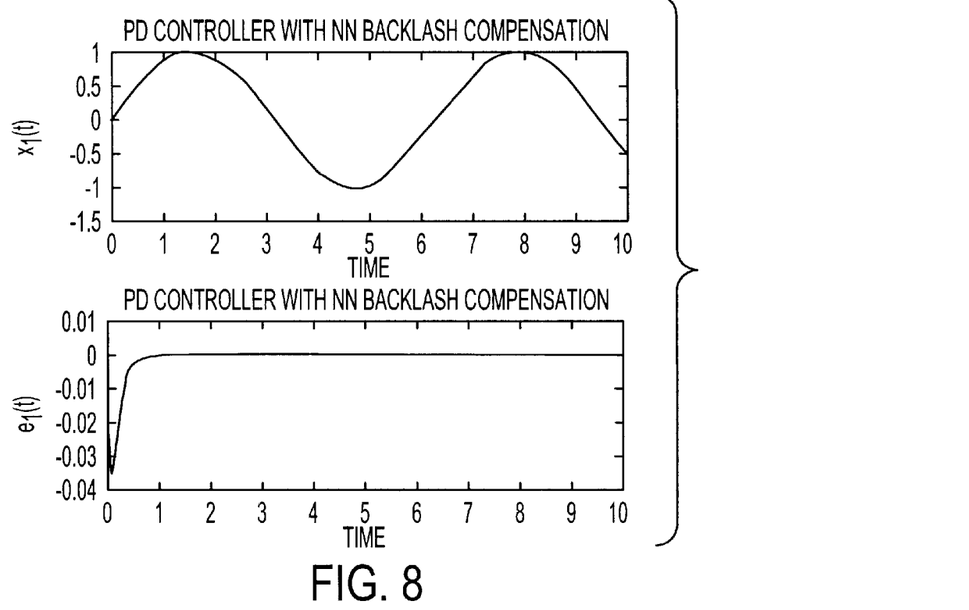
FIG. 8 shows state $x_1(t)$ and tracking error $e_1(t)$ with NN backlash compensation according to one embodiment of the present disclosure.
Figure 9:
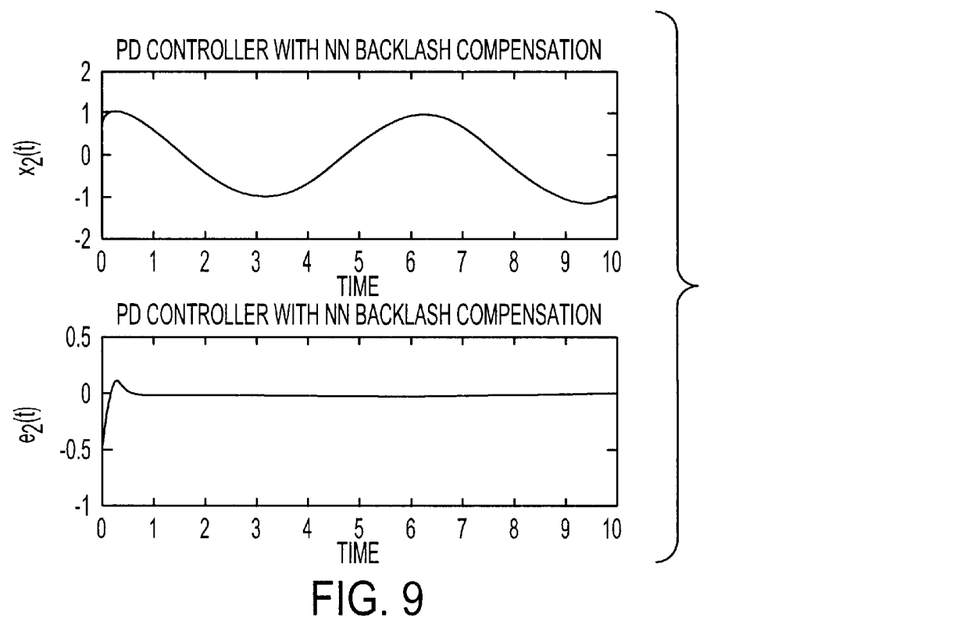
FIG. 9 shows state $x_2(t)$ and tracking error $e_2(t)$ with NN backlash compensation according to one embodiment of the present disclosure.
Figure 10:
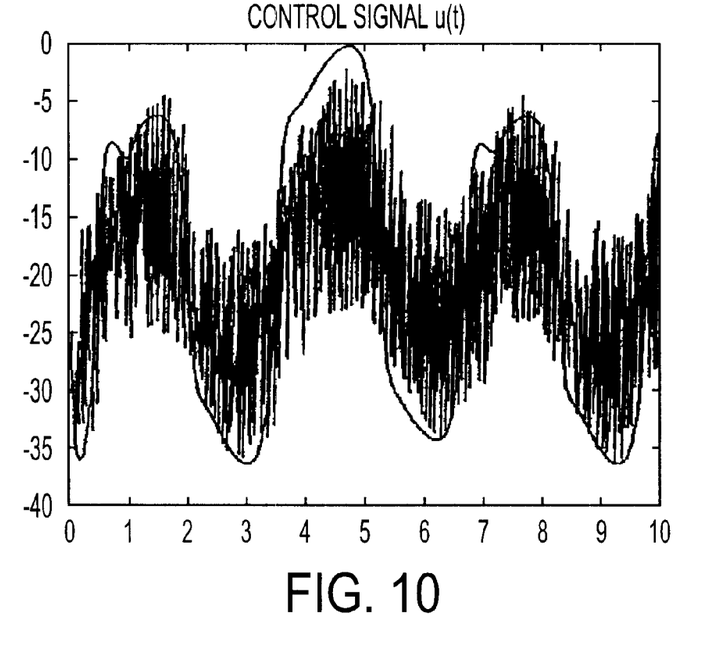
FIG. 10 shows a control signal $u(t)$ without backlash compensation (dash) and with NN backlash compensation (full) according to one embodiment of the present disclosure.

Applying the NN backlash compensator greatly reduces the tracking error. FIGS. 8 and 9 show tracking errors when NN compensator is included. One can see that after 0.5 s neural network adjusts its weights on-line, such that the backlash effect is mostly reduced. FIG. 10 shows the control signal u(t) in both cases; when NN is applied and without NN compensator. It is interesting to note that when the NN is used, the control signal u(t) is in the "envelope" of the control signal u(t) without the NN. The control u(t) has a superimposed high-frequency component that is very similar to that injected using dithering techniques. Therefore, one could consider adaptive NN backlash compensator as an adaptive dithering technique, where the NN inserts dithering signal.

From this simulation it is clear that the proposed NN backlash compensator is an efficient way to compensate for backlash nonlinearities of all kind, without any restrictive assumptions on the backlash model itself.

REFERENCES

The following references are incorporated herein by reference.

[1] R. Barron, "Universal approximation bounds for superpositions of a sigmoidal function," *IEEE Trans. Info. Theory*, vol. 39, no. 3, pp. 930–945, May 1993.

[2] R. G. Bartle, *The Elements of Real Analysis*, Wiley, New York, 1964.

[3] F.-C. Chen, and H. K. Khalil, "Adaptive control of nonlinear systems using neural networks," *Int. J Contr.*, vol. 55, no. 6, pp. 1299–1317, 1992.

[4] M. J. Corless and G. Leitmann, "Continuous state feedback guaranteeing uniform ultimate boundedness for uncertain dynamic systems," *IEEE Trans. Automat. Contr.*, vol. 26, no. 5, pp. 850–861, 1982.

[5] J. J. Craig, *Adaptive Control of Robot Manipulators*, Addison-Wesley, Reading, Mass., 1988.

[6] Cybenko, "Approximation by superpositions of a sigmoidal function," *Math. Contr. Signals, Syst.*, vol. 2, no. 4, pp. 303–314, 1989.

[7] C. A. Desoer and S. M. Shahruz, "Stability of dithered nonlinear systems with backlash or hysteresis," *Int. J Contr.*, vol. 43, no. 4, pp. 1045–1060, 1986.

[8] B. Igelnik and Y. H. Pao, "Stochastic Choice of Basis Functions in Adaptive Function Approximation and the Functional-Link Net," *IEEE Trans. Neural Networks*, vol. 6, no. 6, pp. 1320–1329, November 1995.

[9] D. O. Hebb, *The organization of behavior*, Wiley Inc., New York, 1949.

[10] M. Krstic, I. Kanellakopoulos, and P. Kokotovic, *Nonlinear and Adaptive Control Design*, John Wiley & Sons, New York, N.Y., 1995.

[11] B. S. Kim and A. J. Calise, "Nonlinear flight control using neural networks," *Journal of Guidance, Control, and Dynamics*, vol. 20, no. 1. January–February 1, 1997.

[12] J.-H. Kim, J.-H. Park, S.-W. Lee, and E. K. P. Chong, "A two-layered fuzzy logic controller for systems with deadzones," *IEEE Trans. Industrial Electron.*, vol. 41, no. 2, pp. 155–162, April 1994.

[13] C. Kwan, F. L. Lewis, and D. M. Dawson, "Robust neural-network control of rigid-link electrically driven robots," *IEEE Trans. Neural Networks*, vol. 9, no. 4, pp. 581–588, July 1998.

[14] S.-W. Lee and J.-H. Kim, "Control of systems with deadzones using neural-network based learning control," *Proc. IEEE Int. Conf. Neural Networks*, June 1994, pp. 2535–2538.

[15] J. Leitner, A. Calise and J. V. R. Prasad, "Analysis. of adaptive neural networks for helicopter flight control," *Journal of Guidance, Control, and Dynamics*, vol. 20, no. 5, pp. 972–979, September–October 1997.

[16] F. L. Lewis, C. T. Abdallah, and D. M. Dawson, *Control of Robot Manipulators*, Macmillan, N.Y., 1993.

[17] F. L. Lewis, S. Jagannathan, and A. Yesildirek, *Neural Network Control of Robot Manipulators and Nonlinear Systems*, Taylor and Francis, Philadelphia, Pa., 1999.

[18] F. L. Lewis, A. Yesildirek, and K. Liu, "Multilayer neural-net robot controller with guaranteed tracking performance," *IEEE Trans. Neural Networks*, vol. 7, no. 2, pp. 1–11, March 1996.

[19] F. L. Lewis, K. Liu, R. R. Selmic, and Li-Xin Wang, "Adaptive fuzzy logic compensation of actuator deadzones," *J. Robot. Sys.*, vol. 14, no. 6, pp. 501–511, 1997.

[20] W. Li and X. Cheng, "Adaptive high-precision control of positioning tables-theory and experiment," *IEEE Trans. Control Syst. Technol.*, vol. 2, no. 3, pp. 265–270, September 1994.

[21] M. B. McFarland and A. J. Calise, "Multilayer neural networks and adaptive nonlinear control of agile anti-air missiles," *Preprint*, 1999.

[22] K. S. Narendra and A. M. Annaswamy, "A new adaptive law for robust adaptation without persistent excitation," *IEEE Trans. Automat. Control*, vol. 32, no. 2, pp. 134–145, February 1987.
[23] K. S. Narendra, "Adaptive Control Using Neural Networks," *Neural Networks for Control*, pp. 115–142. ed. W. T. Miller, R. S. Sutton, P. J. Werbos, Cambridge: MIT Press, 1991.
[24] K. S. Narendra and K. Parthasarathy, "Identification and control of dynamical systems using neural networks," *IEEE Trans. Neural Networks*, vol. 1, pp. 4–27, March 1990.
[25] J. Park and I. W. Sandberg, "Criteria for the approximation of nonlinear systems," *IEEE Trans. Circuits Syst.-1*, vol. 39, no. 8, pp. 673–676, August 1992.
[26] J. Park and I. W. Sandberg, "Nonlinear approximations using elliptic basis function networks," *Circuits, Systems, and Signal Processing*, vol. 13, no. 1, pp. 99–113, 1993.
[27] M. M. Polycarpou, "Stable adaptive neural control scheme for nonlinear systems," *IEEE Trans. Automat. Contr.*, vol. 41, no. 3, pp. 447–451, March 1996.
[28] Recker, P. V. Kokotovic, D. Rhode, and J. Winkelman, "Adaptive nonlinear control of systems containing a deadzone," *Proc. IEEE Conf. Decis. Control*, 1991, pp. 2111–2115.
[29] G. A. Rovithakis and M. A. Christodoulou, "Adaptive control of unknown plants using dynamical neural networks," *IEEE Trans. Systems, Man, and Cybernetics*, vol. 24, no. 3, pp. 400–412, 1994.
[30] N. Sadegh, "A perceptron network for functional identification and control of nonlinear systems," *IEEE Trans. Neural Networks*, vol. 4, no. 6, pp. 982–988, November 1993.
[31] R. M. Sanner and J. -J. E. Slotine, "Stable adaptive control and recursive identification using radial gaussian networks," *Proc. IEEE Conf. Decis. Control*, Brighton, 1991.
[32] R. R. Selmic and F. L. Lewis, "Neural network approximation of piecewise continuous functions: application to friction compensation," *Proc. IEEE Int. Symp. Intell. Contr.*, Istanbul, July 1997.
[33] R. R. Selmic and F. L. Lewis, "Deadzone compensation in motion control systems using neural networks," *submitted to IEEE Trans. Automat. Control*.
[34] R. R. Selmic and F. L. Lewis, "Deadzone compensation in nonlinear systems using neural networks," *Proc. IEEE Conf Decis. Control*, Tampa, Fla., 1998.
[35] J.-J. E. Slotine and W. Li, *Applied Nonlinear Control*, Prentice-Hall, N.J., 1991.
[36] Y. D. Song, T. L. Mitchell, and H. Y. Lai, "Control of a class of nonlinear uncertain systems via compensated inverse dynamics approach," *IEEE Trans. Automat. Contr.*, vol. 39, no. 9, pp. 1866–1871, September 1994.
[37] E. D. Sontag, "Neural networks for control," in *Essays on Control: Perspectives in the Theory and its Applications* (H. L. Trentelman and J. C. Willems, eds.), Birkhauser, Boston, 1993, pp. 339–380.
[38] E. D. Sontag, "Feedback stabilization using two-hidden-layer nets," *IEEE Trans. Neural Networks*, 3, pp. 981–990, 1992.
[39] G. Tao and P. V. Kokotovic, "Adaptive control of plants with unknown dead-zones," *IEEE Trans. Automat. Control*, vol. 39, no. 1, pp. 59–68, January 1994.
[40] G. Tao and P. V. Kokotovic, "Continuous-time adaptive. control of systems with unknown backlash," *IEEE Trans. Automat. Control*, vol. 40, no. 6, pp. 1083–1087, June 1995.
[41] G. Tao and P. V. Kokotovic, *Adaptive Control of Systems With Actuator and Sensor Nonlinearities*, John Wiley & Sons, New York, 1996.
[42] A. Tzes, P.-Y. Peng and C.-C. Houng, "Neural network control for DC motor micromaneuvering," *IEEE Trans. Ind. Electron.*, vol. 42, no.5, pp. 516–523, October 1995.
[43] L. Yan and C. J. Li, "Robot learning control based on recurrent neural network inverse model," *J. Robot. Sys.*, vol. 14, no. 3, pp. 199–211, 1997.
[44] A. Yesildirek and F. L. Lewis, "A neural net controller for robots with Hebbian tuning and guaranteed tracking;" *Proc. American Control Conference*, Seatle, Wash., June 1995.

What is claimed is:

1. An adaptive neural network compensator for compensating backlash of a mechanical system, comprising:
a feedforward path;
a proportional derivative tracking loop comprising a proportional derivative path in the feedforward path;
a filter in the feedforward path, the filter configured to take a filtered derivative of a tracking error signal of the compensator to determine a filtered tracking error signal; and
a neural network in the feedforward path and coupled to the filter, the neural network configured to compensate the backlash by estimating an inverse of the backlash and applying the inverse to an input of the mechanical system.

2. The compensator of claim 1, wherein the neural network is tuned according to a Hebbian tuning algorithm characterized by the following equations:

$$\dot{\hat{V}} = -T\|\tilde{\tau}\|x_{nn}\hat{\sigma}^T - kT\|\tilde{\tau}\|\hat{V}; \text{ and}$$

$$\dot{\hat{W}} = -S\hat{\sigma}\tilde{\tau}^T - kS\|\tilde{\tau}\|\hat{W},$$

where V-hat represents an estimate of first layer neural network weights, W-hat represents an estimate of second layer neural network weights, Sigma-hat represents an estimate of neural network hidden-layer output, Tau-tilde represents error in an estimate of an input to the mechanical system, $x_{nn}$ represents an input vector to the neural network, S and T are design weighting matrices, and k is a design convergence parameter.

3. The compensator of claim 1, wherein the filtered tracking error signal is uniformly ultimately bounded.

4. The compensator of claim 1, wherein weight estimates of the neural network are uniformly ultimately bounded.

5. The compensator of claim 1, wherein the filtered tracking error signal and weight estimates of the neural network are uniformly ultimately bounded.

6. The compensator of claim 1, wherein the proportional derivative tracking loop is configured to provide stable feedback control of the mechanical system while weights of the neural network are adjusted from initialization values.

7. The compensator of claim 1, wherein the mechanical system comprises an actuator or robot.

8. An adaptive neural network compensator for compensating backlash of a mechanical system, comprising:
a filter in a feedforward path, the filter configured to determine a filtered tracking error signal;
a neural network in the feedforward path, the neural network configured to compensate the backlash by estimating an inverse of the backlash and applying the inverse to an input of the mechanical system; and
means for tuning the neural network so that the filtered tracking error signal of the compensator is uniformly ultimately bounded.

9. The compensator of claim 8, wherein the means for tuning comprises a Hebbian tuning algorithm.

10. The compensator of claim 8, wherein the mechanical system comprises an actuator or robot.

11. An adaptive neural network compensator for compensating backlash of a mechanical system, comprising:
   a feedforward path;
   a proportional derivation tracking loop comprising a proportional derivative path in the feedforward path;
   a neural network in the feedforward path; and
   a nonlinear estimate feedback loop coupled to the feedforward path.

12. The compensator of claim 11, wherein the neural network the neural network is tuned according a Hebbian tuning algorithm.

13. The compensator of claim 11, wherein the mechanical system comprises an actuator or robot.

14. A method of adaptively compensating backlash in a mechanical system, comprising:
   estimating an inverse of the backlash using a neural network in a feedforward path;
   taking a filtered derivative of a tracking error signal of the compensator using a filter in the feedforward path to form a filtered tracking error signal;
   adjusting weights of the neural network as a function of the filtered tracking error signal using a Hebbian tuning algorithm to achieve closed loop stability; and
   applying the inverse to an input of the mechanical system to compensate the backlash.

15. The method of claim 14, wherein the filtered tracking error is uniformly ultimately bounded.

16. The method of claim 14, wherein weight estimates of the neural network are uniformly ultimately bounded.

17. The method of claim 14, wherein weight estimates of the neural network and the filtered tracking error are uniformly ultimately bounded.

18. The method of claim 14, wherein initial weights V of the neural network are selected randomly and initial weights W of the neural network are set to zero.

19. The method of claim 18, further comprising providing stable feedback control of the mechanical system while weights of the neural network are adjusted from initialization values with a proportional derivative tracking loop comprising a proportional derivative path in the feedforward path.

20. The method of claim 14, wherein the mechanical system comprises an actuator or robot.

* * * * *

UNITED STATES PATENT AND TRADEMARK OFFICE
CERTIFICATE OF CORRECTION

PATENT NO. : 6,611,823 B1
DATED : August 26, 2003
INVENTOR(S) : Selmic et al.

It is certified that error appears in the above-identified patent and that said Letters Patent is hereby corrected as shown below:

Column 19,
Line 15, delete the second occurrence of "the neural network".

Signed and Sealed this

Twenty-eighth Day of October, 2003

JAMES E. ROGAN
*Director of the United States Patent and Trademark Office*